United States Patent [19]

Hodges et al.

[11] 4,082,024

[45] Apr. 4, 1978

[54] POTATO STRIP CUTTER

[75] Inventors: Joseph L. Hodges; Glen R. Green, both of Ontario, Oreg.

[73] Assignee: Ore-Ida Foods, Inc., Boise, Id.

[21] Appl. No.: 745,537

[22] Filed: Nov. 29, 1976

[51] Int. Cl.² .................. B26D 7/06; B26D 3/26
[52] U.S. Cl. ................................. 83/402; 83/98; 83/164; 83/404.3; 83/425.3; 83/858
[58] Field of Search ............... 83/98, 164, 402, 404.1, 83/404.3, 404.4, 407, 404.2, 425.3, 856, 857, 858

[56] References Cited

U.S. PATENT DOCUMENTS

| 2,487,431 | 11/1949 | Floyd | 83/857 X |
|---|---|---|---|
| 3,108,625 | 10/1963 | Lamb et al. | 83/402 |
| 3,109,468 | 11/1963 | Lamb et al. | 83/98 X |
| 3,703,918 | 11/1972 | Borner | 83/425.3 |

Primary Examiner—Willie G. Abercrombie
Attorney, Agent, or Firm—Mallinckrodt & Mallinckrodt

[57] ABSTRACT

Improvements in apparatus and methods for cutting potatoes into strips, wherein the potatoes are carried hydraulically in single file against and through an arrangement of knife blades, rapidly and with great force. The improvements reside in the manner in which the potatoes are preconditioned for cutting, the mechanism by which the potatoes are aligned in the hydraulic stream as they approach the knives, and the knife device by which the potatoes are effectively cut into strips.

13 Claims, 11 Drawing Figures

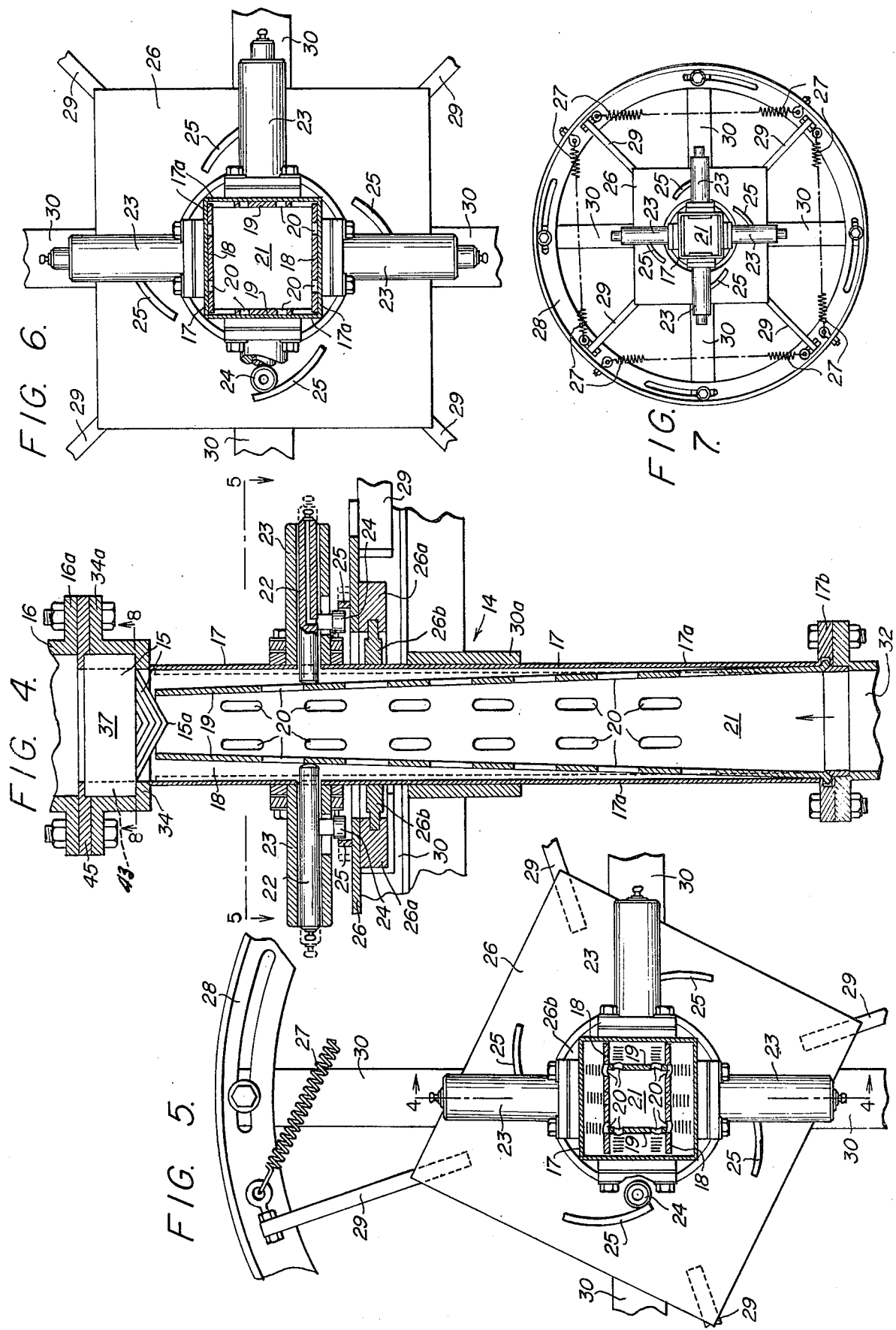

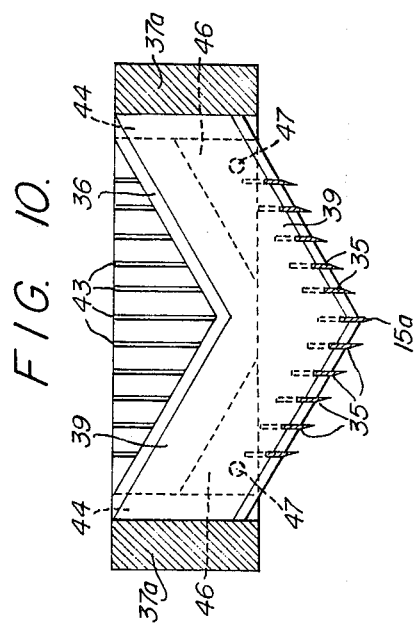
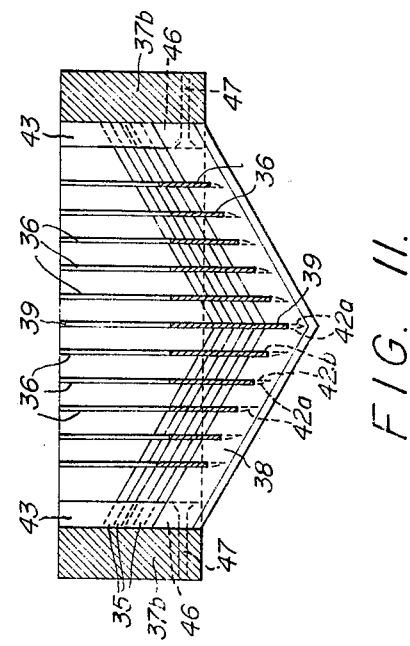
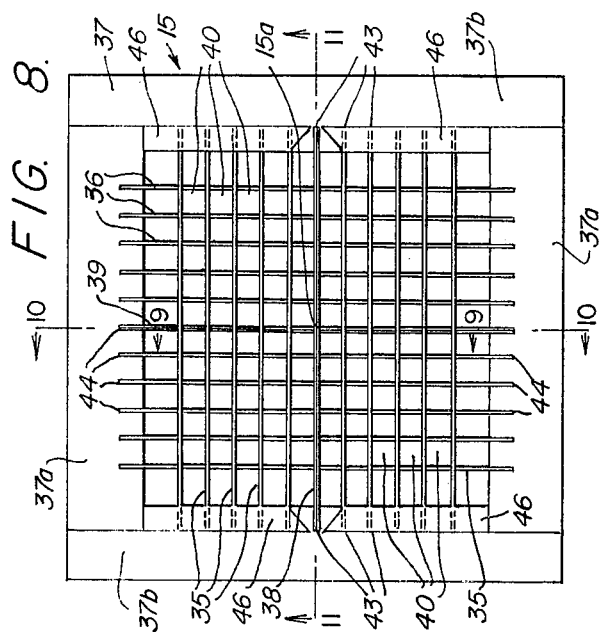
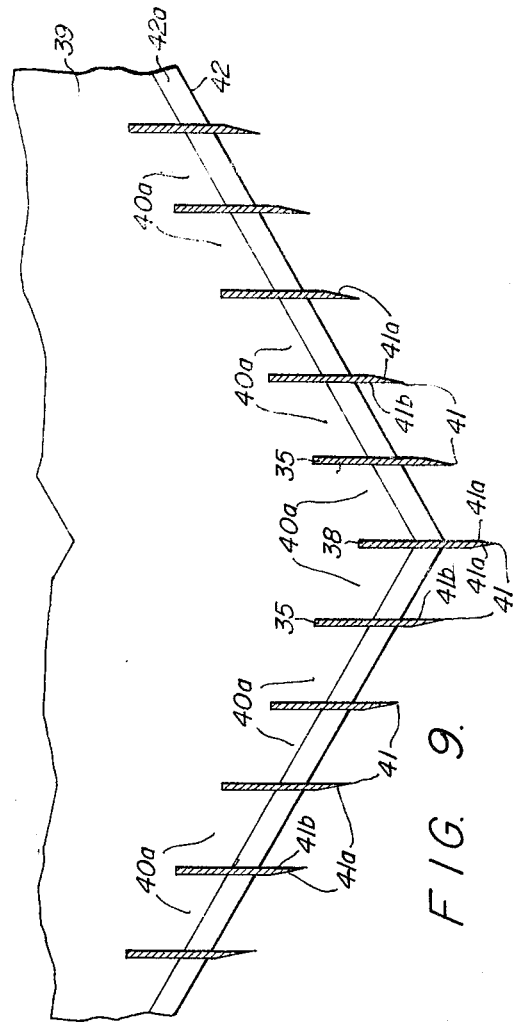

POTATO STRIP CUTTER

BACKGROUND OF THE INVENTION

1. Field

The invention is in the field of methods and apparatus for slicing agricultural produce of the nature of potatoes.

2. State of the Art

The system shown and described in U.S. Pat. No. 3,109,468, issued to F. G. Lamb et al. on Nov. 5, 1963, for "Vegetable Slicing Apparatus," is indicative of the state of the art which it was the major objective of this invention to improve. No indication is given there that the potatoes should be preconditioned. Although it had been recognized that beets should be treated by blanching within vaguely indicated limits prior to slicing in a centrifugal slicing machine, no indication had been given that a somewhat similar but carefully controlled pretreatment of potatoes for hydraulic-stream, strip-cutting thereof to produce French fry and similar elongate cuts would enable speed-up of production, without undesirable fractures in and ragged appearance of the cut potato product. U.S. Pat. No. 2,597,066 to H. M. Chase, as issued May 20, 1952, for "Process for Preparing and Preserving Frozen Potatoes" teaches initial blanching (customarily 160° F. minimum) followed by peeling and then dousing with ice water prior to passing the so-conditioned potatoes through strip cutters or slicing machines, but patents issued to F. G. Lamb et al. for improvements subsequent to the one previously mentioned have given no indication that advantages could be had by preconditioning of the potatoes.

SUMMARY OF THE INVENTION

Conditioning of the potatoes prior to cutting is carried out in accordance with this invention by maintaining the potatoes in a heated environment having a temperature within the range of substantially 130° to 145° F. for a period of from about 40 to 60 minutes in order to heat them throughout. A longer time is not normally detrimental but is not economic. We have found that this preconditioning alters the characteristics of the potatoes such that hydraulic-stream, strip-cutting thereof produces a superior cut product more rapidly than heretofore. This is true whether or not the potatoes are subjected to peeling procedures before or after the conditioning.

The conditioned potatoes are properly aligned end-to-end in the hydraulic stream by passing them through improved aligning mechanism, which positions them most advantageously for movement at high speed into the improved knife device of the invention. It is not necessary to size the potatoes first, nor is the invention restricted to any particular type of potato. The improved knife device has a blade arrangement of pyramidal formation diverging away from the approaching potatoes so that the apex thereof faces the oncoming potatoes and is substantially centered in the hydraulic stream. The system of the invention, considered as a system, does not distinguish nor separate center cuts from side cuts, as does the Lamb et al. system in producing center cuts and side slabs and separating the one type of cuts from the other, but, on the contrary, cuts the entire potato into strips indiscriminantly.

The aligning mechanism of the invention is positioned in an elongate section of the hydraulic conduit, which is preferably square in right cross-section and positioned immediately in advance, i.e., upstream, of the cutter device. It comprises sets of mutually opposite, elongate walls mounted for simultaneous and equal movement toward and away from the longitudinal axis of the conduit section, the movement being traversely of but along the lengths of the walls from their upstream ends which are pivotally fixed in position, to their downstream ends which are freely movable. As these walls are moved inwardly toward but short of the center of the conduit, they progressively and symmetrically decrease the effective cross-sectional area of the conduit until the walls of the two sets meet to limit such decrease to a predetermined minimum. Outward movement away from the center of the conduit is limited by the fixed outer walls of the conduit section.

Means are provided for normally maintaining these walls of the aligning mechanism in the position of minimum cross-sectional area as against outward pressure of the hydraulic stream flowing therethrough, but for effecting simultaneous and equivalent outward movement of such walls under lateral pressure of relatively large potatoes or of those askew in the stream, regardless of which wall or walls such potatoes impinge against.

It has been found that the aligning of potatoes afforded by this improved mechanism is especially advantageous when utilized in conjunction with the improved knife device of the invention, but use of such mechanism is not so limited. It may be used for whatever advantages may accrue in conjunction with other knife devices, for example those of the aforementioned Lamb et al. patents.

Besides the pyramidal configuration of the blades of the improved knife device of the invention, the nested arrangement thereof provides effective support for the individual blades and is a highly significant part of the invention, in that it enables thinner blades to be used and thereby increases the rapidity of cutting action. Moreover, the blades remain sharper longer. Again, this improved cutter device may be used wherever found advantageous, for example, with the aligning and centering mechanisms of the aforesaid Lamb et al. patents.

THE DRAWINGS

In the accompanying drawings, which illustrate both method and apparatus presently contemplated as the best mode of carrying out the invention in actual practice:

FIG. 1 is a flow sheet in the nature of a block diagram showing the several essential steps of the method;

FIG. 2, a view in front elevation of the improved potato strip cutter;

FIG. 3, a view in side elevation;

FIG. 4, a fragmentary vertical section taken on the line 4—4 of FIG. 2 and drawn to a larger scale, the aligning mechanism being in the normally maintained, minimum cross-sectional area condition;

FIG. 5, a horizontal section taken on the line 5—5 of FIG. 2 and drawn to the larger scale of FIG. 4, portions being broken out for convenience of illustration;

FIG. 6, a view corresponding to that of FIG. 5 but showing the mechanism in its maximum cross-sectional area condition;

FIG. 7, a view corresponding to that of FIG. 6 but drawn to a smaller scale and showing the complete mechanism;

FIG. 8, a bottom plan view of the knife device per se considerably enlarged;

FIG. 9, a fragmentary vertical section taken on the line 9—9 of FIG. 8 and drawn to a still larger scale;

FIG. 10, a vertical section taken on the line 10—10 of FIG. 8; and

FIG. 11, a similar view taken on the line 11—11 of FIG. 8.

DETAILED DESCRIPTION OF ILLUSTRATED EMBODIMENT

In accordance with the method, raw potatoes to be cut into strips are preconditioned by controlled heating throughout their bodies in suitable equipment, such as a holding tank through which heated water is continually circulated. The potatoes are held in the tank for a period of from thirty to sixty minutes, depending upon the temperature of the water, which is maintained at from about 130° to 145° F. The potatoes should have attained a body temperature throughout that is substantially no less than 130° F. but short of the temperature that will gelatinize starch, i.e., about 145° F., in order to avoid ragged and fractured cuts on the one hand and undue toughness and resistance to slicing on the other. The potatoes processed may be of any type, and there is no need to size them.

Figure 1:
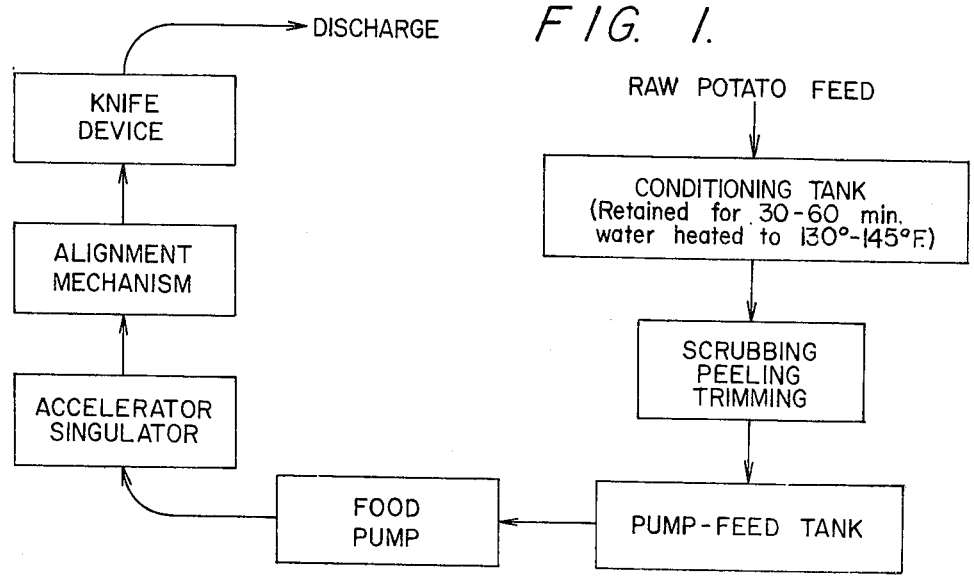
Figure 3:
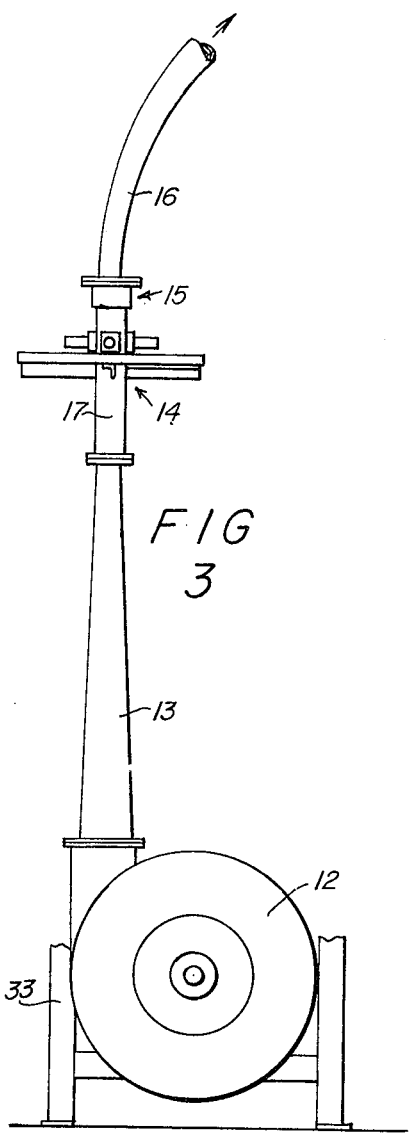
Figure 2:
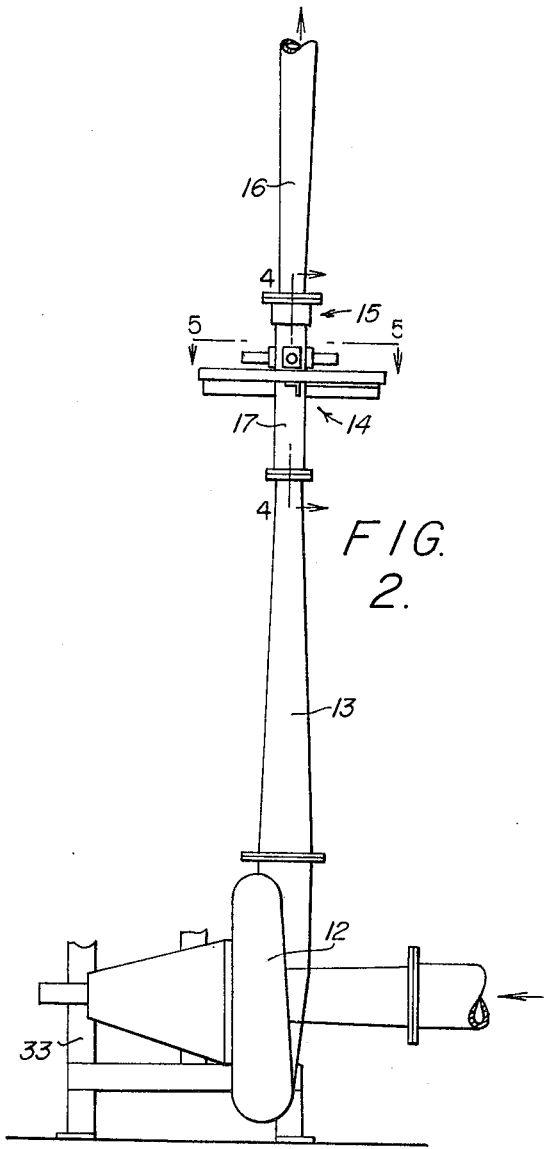

The conditioning treatment may be and preferably is in advance of the usual scrubbing, peeling, and trimming operations, the conditioned and peeled potatoes being carried through the several subsequent operations sequentially, preferably from a suitable pump-feed tank from which they pass into a high velocity food pump, indicated 12 in FIGS. 2 and 3. They are discharged by the pump, as part of a high velocity stream of water, into a usual type of accelerator-singulator, shown in FIGS. 2 and 3 as a vertically positioned, convergent conduit 13 leading into the alignment mechanism 14 of the invention. Mechanism 14 is positioned immediately in advance, i.e., upstream of the knife device 15 of the invention, into and through which the potatoes are hydraulically carried with considerable force and speed usual to a system of the type concerned. The cut product is discharged into and carried through a conduit 16 by which it is preferably carried to a dewatering stage forming no part of the present invention.

ALIGNMENT MECHANSIM

In its illustrated form, the improved aligning mechanism 14 of the invention comprises an elongate conduit section 17, see particularly FIGS. 4, 5, and 6, uniformly square in right cross-section and having fixed and rigid outer walls 17a providing a flow passage for the hydraulically carried, singulated stream of conditioned potatoes leading directly into the improved knife device 15 of the invention. Internally of this conduit section 17 are movable elongate walls that include a set of mutually opposite walls 18 extending along the length of the conduit section and entirely across one transverse dimension thereof, and a second set of mutually opposite walls 19 extending along the length of the conduit section between the walls 18 of the first set but converging along their lengths from their ends that are remote from knife device 15 to their opposite ends that are relatively adjacent to such knife device.

Movable walls 18 and 19 are pivotally fastened, FIG. 4, at their said remote ends to conduit 17 at the inner faces of corresponding walls 17a thereof by any suitable means. As shown, these ends are outwardly flanged and mounted in corresponding recesses in the lower flanged end 17b of conduit 17, enough leeway being provided for the very limited rocking action required during movements of walls 18 and 19.

Alignment mechanism 14 and knife device 15 are interposed between conduits 13 and 16. Both are removably associated with each other and with their respective conduits, so the blades may be removed for sharpening or for replacement and so that any debris that might collect behind the walls 18 and 19 of the alignment mechanism can be removed from time to time.

It will be noted that walls 18 and 19 are provided with slots 20 in order to minimize the hydraulic pressure differential at opposite sides of such walls.

Alignment mechanism 14 comprises means for normally maintaining walls 18 and 19 in the closed position, i.e., the condition of minimum cross-sectional area of the flow passage 21 therethrough, as indicated in FIGS. 4 and 5, against outward hydraulic pressure on such walls, yet enabling such walls to move outwardly, simultaneously and equally, under impact of potatoes on one or more of such walls. As illustrated, such means preferably take the form of pins 22 mounted in respective sleeve slideways 23 and operable against individual walls 18 and 19, respectively, of the two sets of such walls. Each of the pins 22 is provided with a dependent cam wheel 24, operable against respective cam tracks 25 which are mounted on a rotatable plate 26 that is resiliently biased by coil springs 27 anchored at one end to a reaction ring 28 and at the other end to respective arms 29 which extend outwardly from the corners of plate 26. Reaction ring 28 is adjustably mounted on supporting crossarms 30 affixed by means of a square collar 30a to conduit section 17. Plate 26 is rotatably mounted on conduit section 17 as by means of a ring 26a rotatably carried by a circular bearing plate 26b affixed to conduit 17.

As potatoes are hydraulically carried in single file at considerable speed through passage 21 toward knife device 15, they either pass into such knife device without impinging against one or more of the walls 18 and 19 of alignment mechanism 14, or, due either to excessive size or longitudinal misalignment, they forcibly impinge against one or more of such walls 18 and 19.

If any one or more of the potatoes passing through alignment mechanism 14 impinges against one or more of the walls 18 and 19, the wall or walls concerned are forced outwardly away from the longitudinal axis of passage 21 against the opposition of a corresponding pin or pins 22. Regardless of how few walls are involved in the impingement, all of the walls 18 and 19 will be moved simultaneously and equally by reason of the four sets of cam wheels 24 and cam tracks 25 associated with the respective pins. Likewise, such walls will be simultaneously and equally returned to their normal positions of FIGS. 4 and 5 by action of the springs 27 when there is no longer potato impingement.

It should be noted that the lower ends of walls 18 and 19 are retained in position by means of a collar 32, FIG. 4, welded or otherwise secured to the adjoining end of conduit 13, and that the pump and several conduits are maintained in position by suitable supporting structure indicated fragmentarily at 33, FIGS. 2 and 3.

KNIFE DEVICE

Knife device 15 is removably mounted in a holder 34, FIG. 4, welded or otherwise rigidly affixed to the upper end of conduit 17 and having a flange 34a removably secured, as by bolting, to a corresponding flange 16a of discharge conduit 16. It comprises a series of knife blades 35, see especially FIGS. 8–11, and a series of transversely-extending knife blades 36, both removably mounted in a frame 37 and interengaged in a nested, open mesh arrangement of pyramidal formation. The apex of such arrangement confronts the oncoming stream of hydraulically carried potatoes, i.e., is directed toward alignment mechanism 14.

In the form illustrated the apex, 15a, is provided by a protruding central blade 38, the series of blades 35 being interrupted centrally thereof by such apex blade 38. Likewise, the series of blades 36 is interrupted by a blade 39, but at a level in the knife device inset with respect to protruding blade 38. All of the blades 36 are similarly inset in the knife device with respect to their respective adjoining blades 35, so that the initial incisions start potato slices, followed shortly thereafter by transverse cuttings of the incipient slices into potato strips.

A feature of the invention is the arrangement of cutting-edge-forming levels on the respective knife blades of each series, so there will be no binding of the cut potato strips as they pass through the respective, mutually adjoining, box cutters, 40, FIG. 8, making up the knife device. Thus, each of the individual box cutters 40 are fronted by a pair of slicer knife edges 41, disposed at mutually different levels, which are backed transversely thereof by a pair of stripper knife edges 42, also disposed at mutually, different levels, to form an entryway into the box passageway 40a extending through such individual cutter. Each pair of slicer knife edges 41 and each pair of stripper knife edges 42 comprises a beveled edge margin 41a and 42a, respectively, and an unbeveled edge margin 41b and 42b, respectively, the former being substantially entirely in advance of the latter, as illustrated.

It will be noted that apex blades 38 and 39 are beveled at both sides of knife edges 41 and 42, respectively, in providing beveled edge margins for adjoining box cutters at opposite sides thereof.

As so constructed, the blades of the knife device spread initially-cut portions of a potato before respective successive cuts are made, thereby smoothly accommodating advance cut portions of the partially cut potato in the knife device without binding as the potato passes through the side-by-side adjoining, individual box cutters 40 making up the knife device.

The several blades making up knife device 15 are of chevron formation and are preferably mounted in respective slots provided in the interior face portions of the frame members of frame 37, there being slots 43, FIG. 8, in the respective, mutually opposite, frame members 37a, and slots 44 in the respective, mutually opposite, frame members 37b. The blades are nested by the provision of slots in the backs of those of one set for receiving the fronts, i.e., cutting edge portions, of those of the other set. In the illustrated, embodiment, there are slots in the backs of the blades 35 and of apex blade 38 for receiving the cutting edge portions of the blades 36 and of central blade 39.

For convenience of insertion and removal of the individual blades to sharpen them from time to time and to make replacements if and when one or more are seriously damaged for one reason or another, as, for example, by a foreign object being inadvertently present in the stream of potatoes projected against the cutting edges, slots 43 and 44 are preferably open at opposite ends thereof but receive the blades in a close frictional fit so such blades are normally held tightly in place. To prevent backward ejection of the blades during cutting, a plate 45, FIG. 4, peripheral to flow passage 21, is interposed between flange 34a of knife holder 34 and flange 16a of discharge conduit 16. Such plate 45 overlaps the slotted frame members of knife frame 37 and closes the corresponding ends of the slots. To prevent forward ejection of the blades under extraordinary circumstances, triangular recesses are provided forwardly in the slotted interior face portions of frame members 37b for the reception of correspondingly triangular, blade-keeper blocks 46, which are held in place by respective screws 47, FIGS. 10 and 11.

By reason of the nested arrangement of the knife blades, they are self-supporting throughout and can be made thinner than otherwise, e.g., of steel 25/1000 of an inch in thickness. During operation, they nest together tighter and tighter by reason of the cutting pressure, and, as previously mentioned, they spread the incised potato portions during the cutting operation to prevent binding of the cut portions as they pass through the individual box cutters. Because the potato sections are not compressed as they pass through the knife device, the cutting operation is faster and the blades last longer. It has been found that the single bevel cutting edges on the majority of the blades are advantageous, in that they retain their edges longer and provide superior cutting performance.

OPERATION

In the strip cutting of potatoes, the raw potatoes are conditioned for cutting and peeled as previously described and carried hydraulically in single file into and through the alignment mechanism, whereby those which are of elongate configuration are individually aligned with their respective longitudinal axes extending substantially along the longitudinal axis of the hydraulic stream. The individual potatoes are then projected with great force, by reason of the velocity of the stream of water by which they are carried, toward, into, and through the knife device, being cut into strips by the multiplicity of box cutters making up such knife device. In contrast to previous systems of the type concerned, the entire potato is cut into strips. No slab cuts are made at the outside of the potato. This had been found to be unnecessary and undesirable from the standpoint of economy of operation and of product.

It should be realized that other types of vegetables can be strip cut by the apparatus of the invention and that dimensions of the various parts may be adjusted to suit any given instance of use.

Whereas this invention is here illustrated and described with specific reference to an embodiment thereof presently contemplated as the best mode of carrying out such invetnion in actual practice, it is to be understood that various changes may be made in adapting the invention to different embodiments without departing from the broader inventive concepts disclosed herein and comprehended by the claims that follow.

We claim:

1.

In apparatus for cutting items such as potatoes into strips, which apparatus comprises singulating conduit means followed by aligning conduit means, followed by knife conduit means, means for hydraulically feeding items to be cut into said singulating conduit means, and a strip-cutting knife device in said knife conduit means, the combination therewith of aligning mechanism in said aligning conduit means for aligning the longitudinal axes, of any of said items which are elongate, with the hydraulic flow path through said knife conduit means; said aligning mechanism comprising a series of elongate walls internally of said aligning conduit means and peripheral to the flow passage therethrough, each of said walls being hingedly connected to the conduit means at the upstream end of the wall but otherwise free along its length to move toward and away from the longitudinal axis of the conduit; means normally maintaining said walls at respective extreme positions of inward swing to define a flow passage of minimum cross-sectional area through the aligning conduit means; means for simultaneously and equivalently moving all of said walls outwardly to provide a flow passage of increased cross-sectional area through the aligning conduit means when an item, which is being hydraulically carried through the aligning conduit means, impacts against one or more of said walls; and passages in said walls permitting flow of hydraulic fluid to substantially equalize hydraulic pressure against said walls so they are not forced to increased cross-sectional area under hydraulic flow pressure.

2. A combination according to claim 1, wherein the means for moving the movable walls of the aligning mechanism outwardly comprise elements normally abutting the respective walls and movable outwardly, identical cam means associated with the respective elements, and means mounting corresponding elements of said cam means in common so movement of one or more of said abutting elements will effect simultaneous and equivalent movement of all.

3. The combination according to claim 2, wherein the means normally maintaining the movable walls at respective extreme positions of inward swing comprise springs operable on the means mounting corresponding elements of the cam means in common.

4. A combination according to claim 3, wherein the mounting means is a plate mounted on the aligning conduit means exteriorly thereof for rotation therearound, with the longitudinal axis thereof as a center; the abutting elements are pins mounted for movement along their respective longitudinal axes toward and away from the respective movable walls; the cam means for each abutting element comprises a cam wheel affixed rigidly to the pin and a cam track fixedly carried by the mounting plate; and the means normally maintaining the movable walls at respective positions of inward swing comprise a reaction ring encircling said mounting plate and rigidly affixed to the aligning conduit means, and springs yieldably connecting said mounting plate with said reaction ring.

5. A combination according to claim 1, wherein the aligning conduit means is square in right cross-section, and there are four of the movable walls within said conduit means, there being a pair of said walls that are mutually opposite and each commensurate in width with a wall of said conduit means, and a second pair of said walls that are mutually opposite and each correspondingly tapered from its hinged end longitudinally thereof to a width at its tip end that determines the minimum cross-sectional area of the flow passage through said aligning conduit means.

6. A combination according to claim 1, wherein the strip-cutting knife device is of pyramidal formation, with its apex directed toward the oncoming stream of hydraulically fed items during operation of the apparatus, and comprising mutually intersecting series of knife blades spaced from one another to provide a multiplicity of individual, side-by-side, box cutters, throughout the cross-sectional area of the flow passage through the knife conduit means, said blades being nestingly interengaged and sharpened along their cutting edges such that each box cutter is fronted by a pair of slicer knife edges disposed at mutually different levels stepwise, and is backed transversely thereof by a pair of stripper knife edges also disposed at mutually different levels, stepwise, the advance knife edge of each pair being beveled along its margin interiorly of the box, and the other knife edge of each pair being unbeveled, the beveled portion of the former knife edge being substantially entirely in advance of the latter knife edge, whereby advance cuts are made and spread in the instance of each pair for each box cutter before subsequent cuts are made by such pair.

7. A combination according to claim 6, wherein each knife blade is of chevron configuration.

8. In apparatus for cutting items such as potatoes into strips, which apparatus comprises singulating conduit means followed by aligning conduit means, followed by knife conduit means, means for hydraulically feeding items to be cut into said singulating conduit means, a strip-cutting knife device in said knife conduit means, and aligning mechanism in said aligning conduit means for aligning the longitudinal axes, of any of said items which are elongate, with the hydraulic flow path through said knife conduit means, said strip-cutting knife device being of pyramidal formation, with its apex directed toward the oncoming stream of hydraulically fed items during operation of the apparatus, and comprising mutually intersecting series of knife blades spaced from one another to provide a multiplicity of individual, side-by-side, box cutters throughout the cross-sectional area of the flow passage through the knife conduit means, said blades being nestingly interengaged and sharpened along their cutting edges such that each box cutter is fronted by a pair of slicer knife edges disposed at mutually different levels, stepwise, and is backed transversely thereof by a pair of stripper knife edges also disposed at mutually different levels, stepwise, the advance knife edge of each pair being beveled along its margin interiorly of the box, and the other knife edge of each pair being unbeveled, the beveled portion of the former knife edge being substantially entirely in advance of the latter knife edge, whereby advance cuts are made and spread in the instance of each pair for each box cutter before subsequent cuts are made by such pair.

9. A combination according to claim 8, wherein each knife blade is of chevron configuration.

10. A combination according to claim 8, wherein each knife blade is individually formed for separate removal from nested interengagement, the knife device including a peripheral frame provided with open-ended slots for insertion and removal of the respective knife blades; wherein the knife conduit means includes a knife holder for removable reception of the knife device; wherein means are associated with the knife holder for blocking downstream ends of the knife-blade-receiving slots; and wherein means are associated with said peripheral frame for blocking upstream ends of the knife-blade-receiving slots for the upstream-located set of knife blades.

11. A combination according to claim 10, wherein the means for blocking upstream ends of the knife-bladereceiving slots for the upstream set of knife blades comprise block members inset into the slotted frame members and removably affixed to said frame members.

12. A knife device for cutting items, such as potatoes into strips, comprising a peripheral frame defining an opening for the passage therethrough of items to be cut; mutually intersecting series of knife blades having their ends mounted in said frame and otherwise extending across said opening in mutually spaced, pyramidal formation to provide a multiplicity of individual, side-by-side, box cutters throughout the area of said opening of the frame, said blades being nestingly interengaged and sharpened along their cutting edges such that each box cutter is fronted by a pair of slicer knife edges disposed at mutually different levels, stepwise, and is backed transversely thereof by a pair of stripper knife edges also disposed at mutually different levels, stepwise, the advance knife edge of each pair being beveled along its margin interiorly of the box, and the other knife edge of each pair being unbeveled, the beveled portion of the former knife edge being substantially entirely in advance of the latter knife edge, whereby advance cuts are made and spread in the instance of each pair for each box cutter before subsequent cuts are made by such pair.

13. A combination according to claim 12, wherein each knife blade is of chevron configuration.

* * * * *